US012697725B2

(12) United States Patent
Brahmbhatt et al.

(10) Patent No.: US 12,697,725 B2
(45) Date of Patent: Aug. 4, 2026

(54) ROBOT SIMULATOR WITH EFFICIENT CONTACT WRENCH ESTIMATION

(71) Applicant: Intel Corporation, Santa Clara, CA (US)

(72) Inventors: Samarth Manoj Brahmbhatt, Mountain View, CA (US); German Ros Sanchez, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 225 days.

(21) Appl. No.: 18/523,971

(22) Filed: Nov. 30, 2023

(65) Prior Publication Data

US 2025/0178198 A1 Jun. 5, 2025

(51) Int. Cl.
*B25J 9/16* (2006.01)

(52) U.S. Cl.
CPC ............ *B25J 9/1671* (2013.01); *B25J 9/163* (2013.01); *B25J 9/1633* (2013.01); *B25J 9/1653* (2013.01); *B25J 9/1664* (2013.01)

(58) Field of Classification Search
CPC ........ B25J 9/1671; B25J 9/163; B25J 9/1633; B25J 9/1653; B25J 9/1664; B25J 9/1628; B25J 9/1651; B25J 9/1656; B25J 9/1669; B25J 9/1687; B25J 9/1692; B25J 9/1694; B25J 13/085; G05B 13/04; G05B 13/042; G05B 19/41885; G05B 2219/13186;

G05B 2219/23456; G05B 2219/23445; G05B 2219/32359; G05B 2219/32385; G05B 2219/35308; G05B 2219/36063; G05B 2219/40318
See application file for complete search history.

(56) References Cited

U.S. PATENT DOCUMENTS

| | | | |
|---|---|---|---|
| 10,556,336 B1 * | 2/2020 | Bai ........................ | B25J 9/1671 |
| 2021/0347054 A1 * | 11/2021 | Saadat Dehghan .... | B25J 13/085 |
| 2023/0090384 A1 * | 3/2023 | Spenninger ........... | B25J 9/1694 |

OTHER PUBLICATIONS

Elandt, Ryan et al., "A pressure field model for fast, robust approximation of net contact force and moment between nominally rigid objects", IEEE/RSJ International Conference on Intelligent Robots and Systems (IROS), IEEE, Aug. 5, 2019, 8 pages.

(Continued)

*Primary Examiner* — Esvinder Singh
(74) *Attorney, Agent, or Firm* — Viering, Jentschura & Partner mbB

(57) ABSTRACT
Disclosed herein are devices, methods, and systems for optimizing a robot simulator through calibration and/or training. The system collects real-world data points and simulation data points of a movement of a robot based on a heuristic policy that defines a threshold criterion for the movement of the robot. At least two data points of the simulation data points are time-aligned to corresponding data points of the real-world data points at times where the threshold criterion is satisfied. A transformation parameter is determined that is defined by a function that relates, for each simulation data point of the at least two data points and its corresponding real-world data point of the corresponding data points, a real-world magnitude of the real-world data point to a simulation magnitude of the simulation data point.

19 Claims, 4 Drawing Sheets

(56)        References Cited

OTHER PUBLICATIONS

Satyanarayana, S. et al., "Finite element modeling of fixture—workpiece contacts: single contact modeling and experimental verification", International Journal of Machine Tools and Manufacture—Design, Research and Application, vol. 44, 2004, pp. 903-913.

Freeman, Daniel C. et al.; "Brax—A Differentiable Physics Engine for Large Scale Rigid Body Simulation"; 35. Conference on Neural Information Processing Systems, Datasets and Benchmarks Track (Round 1); retrieved from https://arxiv.org/abs/2106.13281v1 on Nov. 23, 2023; dated 2021; 21 pages.

Hwangbo, Jemin et al.; "Learning agile and dynamic motor skills for legged robots"; Science Robotics; vol. 4; retrieved from https://www.science.org/doi/epdf/10.1126/scirobotics.aau5872 on Nov. 23, 2023, dated Jan. 16, 2019; 14 pages.

Schoettler, Gerrit et al., "Meta-Reinforcement Learning for Robotic Industrial Insertion Tasks", IEEE/RSJ International Conference on Intelligent Robots and Systems (IROS), IEEE, May 2020, 9 pages.

Le Cleac'h, Simon et al., "Single-Level Differentiable Contact Simulation", IEEE Robotics and Automation Letters, Jan. 2023, 12 pages.

Osburg, Jonas et al.; "Using Deep Neural Networks to Improve Contact Wrench Estimation of Serial Robotic Manipulators in Static Tasks"; Frontiers in Robotics & AI; vol. 9; retrieved from https://www.frontiersin.org/articles/10.3389/frobt.2022.892916/full on Nov. 23, 2023; dated Apr. 28, 2022; 13 pages.

Zhou, Yifan et al.; "Learning modular language-conditioned robot policies through attention"; Autonomous Robots; retrieved from https://link.springer.com/article/10.1007/s10514-023-10129-1 on Nov. 23, 2023; dated Aug. 30, 2023; 21 pages.

* cited by examiner

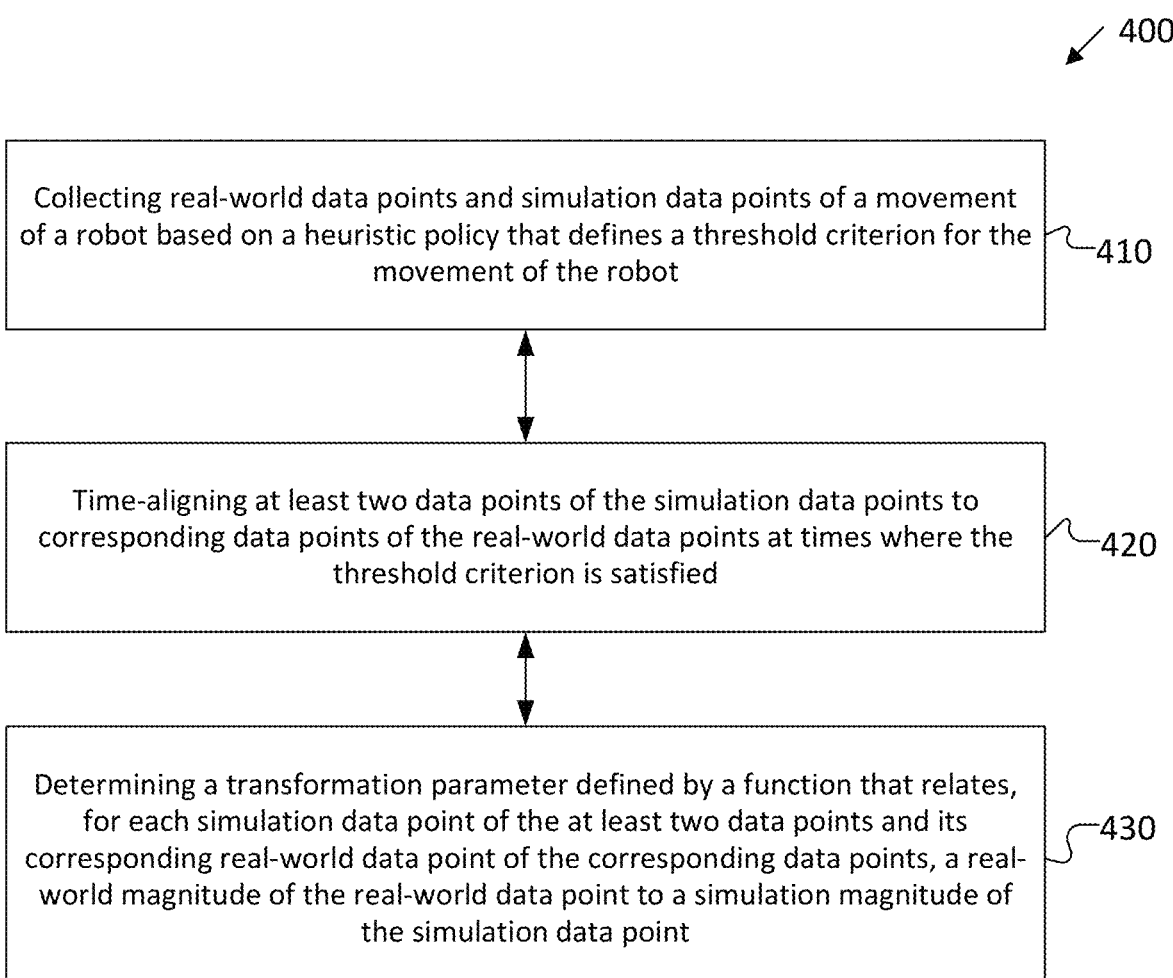

400

Collecting real-world data points and simulation data points of a movement of a robot based on a heuristic policy that defines a threshold criterion for the movement of the robot ⟳—410

Time-aligning at least two data points of the simulation data points to corresponding data points of the real-world data points at times where the threshold criterion is satisfied ⟳—420

Determining a transformation parameter defined by a function that relates, for each simulation data point of the at least two data points and its corresponding real-world data point of the corresponding data points, a real-world magnitude of the real-world data point to a simulation magnitude of the simulation data point ⟳—430

FIG. 4

ROBOT SIMULATOR WITH EFFICIENT CONTACT WRENCH ESTIMATION

TECHNICAL FIELD

The disclosure relates generally to robotics, and in particular, to robot simulation systems that estimate real-world robot data, such as contact force and torque, using simulated movements of a robot in a simulated environment.

BACKGROUND

Robotic simulators are often used to generate tasks for a robot. For example, the operator may use the simulator to specify and plan a manipulation task such as grasping an object, moving it to a location, and placing it within the work environment. Such simulators often use real-world data to calibrate and train the robot simulator. An accurately calibrated and trained simulator may be important for generating real-world movements for the robot to reliably and accurately perform the given task. The robot simulator may estimate, for example, contact force and torque for the simulated task, but if these estimates are inaccurate, the real-world implementation may be jeopardized. Inaccurate simulations may inhibit training and prevent safe execution by the robot of its assigned task in its real-world environment. Because of the problems associated with such inaccuracies, simulators may utilize complex models, large amounts of real-world data, and/or a long training dataset in hopes of reducing these inaccuracies.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which:

FIG. 4 depicts a schematic flow diagram of an exemplary method for calibrating and/or training a robot simulator.

DESCRIPTION

Figure 1:
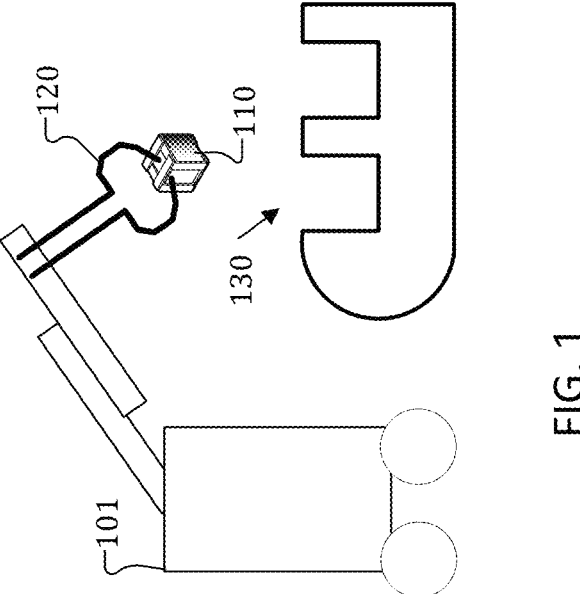
FIG. 1 shows an example robot scenario where a robot is grasping an object that is to be placed in a designated location.

The following detailed description refers to the accompanying drawings that show, by way of illustration, exemplary details and features.

The word "exemplary" is used herein to mean "serving as an example, instance, or illustration." Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements] ") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in the form of a pointer. The term "data", however, is not limited to the aforementioned examples and may take various forms and represent any information as understood in the art.

The terms "processor" or "controller" as, for example, used herein may be understood as any kind of technological entity (e.g., hardware, software, and/or a combination of both) that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, software, firmware, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as radio frequency (RF) transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both "direct" calculations via a mathematical expression/formula/relationship and 'indirect' calculations via lookup or hash tables and other array indexing or searching operations.

As noted above, a robot simulator may estimate, for example, contact force and torque for the simulated task, but if these estimates are inaccurate, in may not be possible to accurately and efficiently train the robot. Moreover, the robot may not safely execute its assigned, simulated task when translated into its real-world environment. As a result, simulators often utilize complex models, large amounts of real-world data, and/or a long training dataset in hopes of reducing these inaccuracies.

With respect to an estimated contract wrench (e.g., contact forces and torques actin on the robot), for example, simulator estimates may be used when training a robot to perform movements/tasks such as manipulation of an object (e.g., an insertion-type task such as grasping a semiconductor chip and placing it in a socket as part of a automated chip/circuit board manufacturing process). If the simulator estimates are inaccurate, it may be difficult to safely, efficiently, and scalably teach a robot using real-world environment data (e.g., contact wrench measurements). As used herein, the term "contract wrench" refers to a mathematical representation of contact force(s) and torque(s) acting on a robot at a given time. A contact wrench is typically a vector that includes force and torque values in multiple dimensions, such as a three-dimensional space, where forces are provided in three directions (x, y, and z) and torques are provided around three axes (around the x-axis, around the y-axis, and around the z-axis). The "magnitude" of the contact wrench is a mathematically determined scalar, using standard vector magnitude formulas, taking into account the force and torque components in the vector (e.g., for the multiple dimensions). A contact wrench may be helpful when defining real-world tasks for a robot, such as object manipulation tasks. For example, an object such as a glass may break when grasped with too much force or released from too high of an elevation above a surface. Thus, knowing (e.g., in the "real-world" or "ground truth") and/or estimating (e.g., via a simulator) the contact wrench at different points in time may be helpful for ensuring safe handling of objects by a robot.

Contact wrench simulations that generate estimates of contact wrench vectors may involve highly complex simulation models that estimate the contact between object geometries. Such highly complex simulation models, however, may be computationally inefficient and may not lend themselves to reinforcement learning (e.g., training the model with real-world data measurements), which may require stepping speeds faster than real time. Other simulators may implement the simulation in a differentiable manner so as to allow for optimizing simulation parameters (e.g. contact model parameters) using real-world experience data to improve the accuracy of contact models through system identification. Still other simulation methods may learn to regress the contact wrench from a history of robot kinematics and commanded motions. Such methods, however, often require a prohibitively large amount of data.

"Meta" learning methods, such as meta reinforcement learning (RL), do not necessarily optimize the contact wrench estimation model itself, and meta RL may condition the robot manipulation policy that is to be learned by the robot (e.g., a mapping function from an observation of a task state to a robot action) on task context features. The algorithm may then "learn to learn" task context features for each environment from initial experience collected in that environment (thus, the name "meta" learning). The meta learning may make it possible for the task context features to compensate for inaccurate contact wrench simulation. While meta RL methods also require some real-world robot data to adapt to the given environment, the amount of data required may not be as large as other conventional methods described above because a meta RL method may optimize for the overall task reward. However, meta RL methods may require much longer overall training times because of meta-learning (e.g., they may need to loop through many randomized environments in order to "learn to learn" sufficient task contexts). Another disadvantage is that meta RL methods may also require knowledge of which aspects of contact models should be randomized in each meta training environment, where only the aspects that are randomized may be captured in the task context features. Another disadvantage is that there is no guarantee that contact wrench correction parameters can be learned in the given task context, which may lead to loss of interpretability.

In contrast to existing simulators, the disclosed simulator discussed in more detail below may reduce the need for such a prohibitively large amount of data, complex simulation models, and/or extensive training. This is because the disclosed simulator may be calibrated using the magnitude (e.g., a scalar value) of the contact wrench when optimizing the transformation parameter(s), rather than using all of the individual dimensions of the contact wrench. The magnitude of the contact wrench may be sufficient for effectively optimizing learning and simulations for robot tasks such as object picking, manipulation, and placement. The disclosed simulator may, during calibration, fit an algebraic transform to convert contact wrench data from the simulation distribution to the real-world distribution. This transformed, simulated contact wrench may then be used in simulation as an observation for training/learning the robot movement policies such as a manipulation policy for insertion-type tasks (e.g., inserting chips into sockets). Such a policy, which may be completely learned in simulation, may then be deployed to a real-world robot for executing the movement policy.

For example, the disclosed simulator may help increase the adaptability of insertion-type automated chip manufacturing tasks, enabling more flexible validation processes with decreased reconfiguration effort and decreased costs. If the robot motion policy for insertion is intelligent, where the task parameters like socket locations, insertion motions, etc. are not hardcoded but must be intelligently determined, the assembly line may benefit from the disclosed simulator by quickly adapting to different types of products (e.g., different chips) for multiple different clients, with little or no time needed to re-program for the specific differences.

FIG. 1 shows an example of a robot environment where a simulator that accurately estimates a contact wrench may be desirable. Robot 101 may be given the task of picking-up an object 110 with its end-effector 120 and placing it in slot 130. Accurate contact wrench estimates may be important so that object 110 is not damaged while it is being handled and so that the motion controller of the robot 101 may accurately plan, via the simulator, safe movements for placing object 110 into slot 130.

Figure 2:
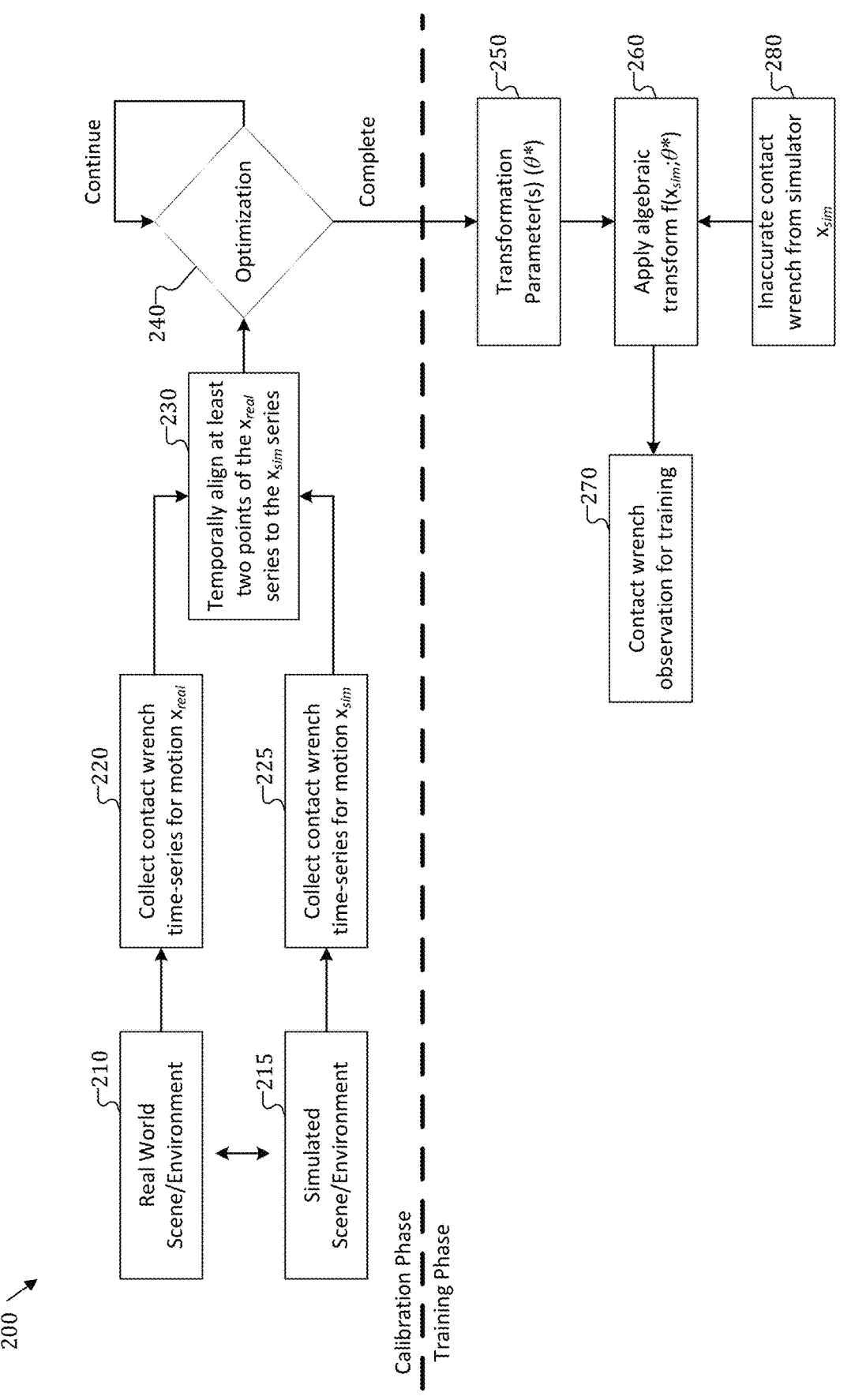
FIG. 2 shows an exemplary flow diagram of a calibration phase and a training phase of a robot simulator.

FIG. 2 shows an example block diagram 200 of how a simulator may be calibrated and trained with improved contact wrench estimates. The block diagram 200 may be understood as showing two phases: (1) the calibration phase, depicted above the dashed line, in which an algebraic transform $f(\cdot; \theta)$ is fit with parameters ($\theta$) that transforms simulated contact wrenches to the real-world distribution; and (2) the training phase, depicted below the dashed line, where simulated contact wrench observations are transformed using the fitted algebraic transform $f(\cdot; \theta)$ before being input to the robot's motion policy. The robot's motion policy is then trained to do a particular task (e.g., insertion type tasks, such as inserting a chip into a socket). The final phase (not shown) is deployment, where the trained policy is deployed on the real robot in the real deployment environment to perform its assigned task(s).

More particularly, starting with the calibration phase above the dotted line of FIG. 2, a real world scene/environment 210 is constructed for a real robot (e.g., the deployment (or similar) environment in which the robot will be operating). A simulated scene/environment 215 is also created that corresponds to the real world scene/environment 210. For example, identical scenes may be set up in the real-world environment and in a simulation environment, where, for example, the robot is holding an object and is situated in front of a table. The robot simulation model that is included with the robot may be used, and the alignment in terms of the dimensions of the table and object may be approximate.

The simulator may collect real-world experience data in 210 by actually moving the robot in the real environment using a heuristic policy and, in 220, as the robot makes a movement, collecting real-world data (e.g., sensor measurements for the contact wrench) at different points in time to record a time-series of contact wrench data for the real-world motion ($x_{real}$). Using the simulated scene/environment 215, the simulator may also simulate the robot's behavior according to the same heuristic policy and collect simulation data (e.g., estimated data for the contact wrench) over time to record a time-series of simulated contact wrench data for the simulated motion ($x_{sim}$). In other words, the same heuristic robot motion policy is applied in both the real world environment and the simulation environment (e.g., move the end-effector down with a known velocity until a certain threshold of upward force is experienced at the end-effector, i.e., when the held object collides with the table top). The motion of the robot may be selected to induce changes in the contact wrench during the course of the motion (e.g., a contact event that causes the force(s) and/or torque(s) experienced by the robot to change).

In 230, the two collected time-series data sets (real-world data and simulation data), may be temporally aligned based on the time stamp where they each satisfy the same threshold criteria (e.g., the point in time at which each data set exhibits the maximum upward force (e.g., as the object collides with the table top, creating an upward force on the end-effector)). The temporally aligned data may include a number (N) of two or more aligned data points from each data set (e.g., N≥2).

Using the subsets of aligned data points, the calibration may optimize, in 240, transformation parameters $\theta$ using an objective function (e.g. linear least squares) that relates the aligned the real-world data points to its corresponding simulation data points. In particular, the optimization may be based only the magnitudes of the real-world and simulation data points (e.g., a magnitude of the contact wrench vectors, rather than optimizing on the individual dimensions of the contact wrench vectors). For example, the objective function may be a linear least squares optimization, where $$\theta^* = 1/N \sum_{i=1}^{N} \min_{\theta} (\|x_{real}^{(i)}\| - f(\|x_{sim}^{(i)}\|; \theta))^2$$

In the above equation, $\theta$ is the transformation parameter and $\theta^*$ is the optimized transformation parameter, N are the data points in the subset of aligned data, and $$\|x_{real}^{(i)}\|$$

and $$\|x_{sim}^{(i)}\|$$

are the wrench magnitudes at the time where the threshold criteria is satisfied (e.g., the point in time at which each data set exhibits the maximum upward force). In particular, only the magnitude of the simulated contact wrench vectors and real-world contact wrench vectors need to be optimized, not their individual components (e.g., the individual contact force and/or torques in multiple dimensions). This provides for a simpler mathematical model for the objective function $f(\cdot; \theta)$, which may not only reduce mathematical complexity but also may significantly reduce the amount of data need for optimization. As compared to conventional methods, for example, only 200 data points may be necessary whereas other methods such as meta-reinforcement learning may require 1,000 data points and complex simulation-based models may require more than 30,000 data points. With a smaller number of data points, it becomes feasible (e.g., from a cost and time perspective) to collect real-world data for calibration that still provides good simulation performance (if not better) as compared to data-heavy models.

In the training phase, using, at 250, the optimized transformation parameter $\theta^*$, an algebraic transform is applied, at 260, that relates simulation data to an observation (e.g., sensor data/measurements) of contact wrench data used for training, in 270. Inaccuracies in the simulated contact wrench data may be fed back, in 280, into the algebraic transform to train the simulator with the goal of reducing the inaccuracies.

Figure 3:
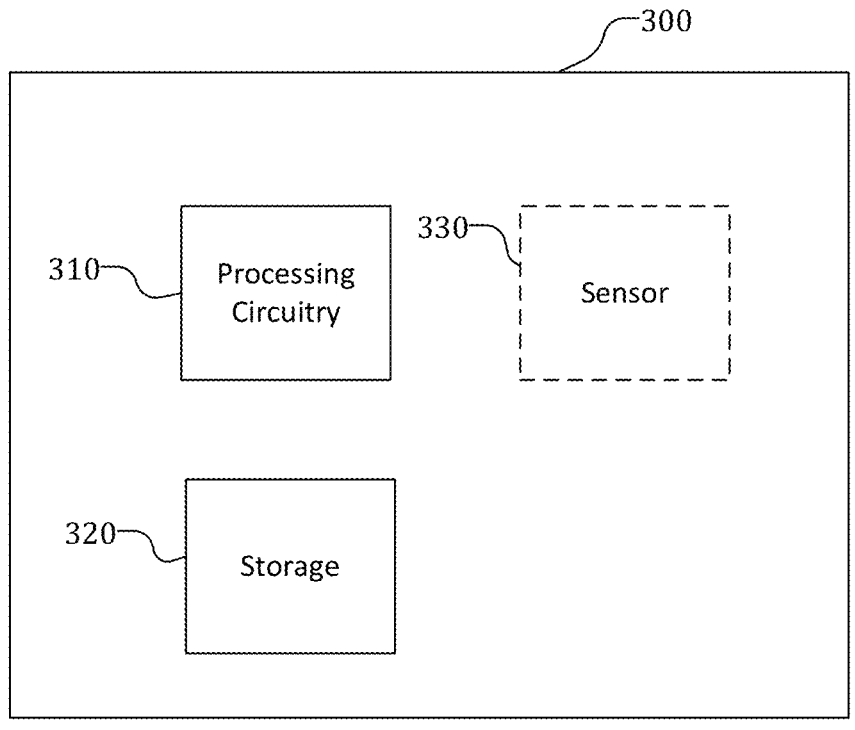
FIG. 3 shows an exemplary schematic drawing of a device for calibrating and/or training a robot simulator.

FIG. 3 is a schematic drawing illustrating a device 300 for calibrating and/or training a simulator with transformation parameters. Device 300 may include any of the features described above, including those with respect to calibrating and/or training a simulator. The device 300 of FIG. 3 may be implemented as a device, a method, and/or a computer readable medium that, when executed, performs the features of the simulator described above, including those with respect to calibrating and/or training a simulator. It should be understood that device 300 is only an example, and other configurations may be possible that include, for example, different components or additional components.

Device 300 includes processing circuitry 310 connected to storage 320. In addition to or in combination with any of the features described in the following paragraphs, processing circuitry 310 is configured to collect real-world data points and simulation data points of a movement of a robot based on a heuristic policy that defines a threshold criterion for the movement of the robot. In addition to or in combination with any of the features described in the following paragraphs, processing circuitry 310 is also configured to time-align at least two data points of the simulation data points to corresponding data points of the real-world data points at times where the threshold criterion is satisfied. In addition to or in combination with any of the features described in the following paragraphs, processing circuitry 310 is also configured to determine a transformation parameter defined by a function that relates, for each simulation data point of the at least two data points and its corresponding real-world data point of the corresponding data points, a real-world magnitude of the real-world data point to a simulation magnitude of the simulation data point.

Furthermore, in addition to or in combination with any of the features described in this or the preceding paragraph with respect to device 300, processing circuitry 310 may be configured to determine the transformation parameter based only on the real-world magnitude and the simulation magnitude. Furthermore, in addition to or in combination with any of the features described in this or the preceding paragraph, the real-world data point may include a measured contact wrench vector of an end-effector of the robot and the simulation data point includes a simulated contact wrench vector for the end-effector of the robot. Furthermore, in addition to or in combination with any of the features described in this or the preceding paragraph, the real-world magnitude may include a magnitude of the measured contact wrench vector and the simulation magnitude may include a magnitude of the simulated contact wrench vector. Furthermore, in addition to or in combination with any of the features described in this or the preceding paragraph, the measured contact wrench vector and simulated contact wrench vector may each include a six-dimensional vector that includes a force component in three directions and a torque component around three axes. Furthermore, in addition to or in combination with any of the features described in this or the preceding paragraph, the measured contact wrench vector may include a measured force and measured torque exerted at a point of contact between the robot and an object in an environment of the robot, wherein the simulated contact wrench vector may include a simulated force and simulated torque exerted at a simulated point of contact in a simulation of the robot and the environment.

Furthermore, in addition to or in combination with any of the features described in this or the preceding two paragraphs with respect to device 300, the threshold criterion may be in terms of at least one dimension of a contact wrench vector. Furthermore, in addition to or in combination with any of the features described in this or the preceding two paragraphs, the threshold criterion may include a maximum force along a direction of movement of the robot. Furthermore, in addition to or in combination with any of the features described in this or the preceding two paragraphs, processing circuitry 310 may be further configured to generate movement instructions for the robot to perform a task, wherein the movement instructions may be based on a transformation, according to the transformation parameter, of a simulated data point of the task to a real world data point of the task. Furthermore, in addition to or in combination with any of the features described in this or the preceding two paragraphs, device 300 may further including a sensor 320 configured to collect measurements (e.g., force/torque values) representing the real-world data points. Furthermore, in addition to or in combination with any of the features described in this or the preceding two paragraphs, the real-world data points may include a series of measured contact wrench vectors collected at different points in time during the movement of the robot.

Furthermore, in addition to or in combination with any of the features described in this or the preceding three paragraphs with respect to device 300, the simulation data points may include simulated contact wrench vectors at different points in time during the movement of the robot. Furthermore, in addition to or in combination with any of the features described in this or the preceding three paragraphs, the heuristic policy may include one or more rules that relate the threshold criterion in terms of a contact wrench vector. Furthermore, in addition to or in combination with any of the features described in this or the preceding three paragraphs, processing circuitry 310 may be configured to determine the transformation parameter based on a linear least-squares optimization. Furthermore, in addition to or in combination with any of the features described in this or the preceding three paragraphs, the movement may include a change in position of an end-effector of the robot until the threshold criterion is satisfied.

Furthermore, in addition to or in combination with any of the features described in this or the preceding four paragraphs with respect to device 300, the transformation parameter may include an output of a learning model that represents the function. Furthermore, in addition to or in combination with any of the features described in this or the preceding four paragraphs, processing circuitry 310 may be configured to train a learning model based on instructing the robot to execute a task and evaluating a resulting execution of the task.

FIG. 4 depicts a schematic flow diagram of a method 400 for calibrating/training a simulator. Method 400 may implement any of the features of the simulator and its calibration/training described above.

Method 400 includes, in 410, collecting real-world data points and simulation data points of a movement of a robot based on a heuristic policy that defines a threshold criterion for the movement of the robot. Method 400 also includes, in 420, time-aligning at least two data points of the simulation data points to corresponding data points of the real-world data points at times where the threshold criterion is satisfied. Method 400 also includes, in 430, determining a transformation parameter defined by a function that relates, for each simulation data point of the at least two data points and its corresponding real-world data point of the corresponding data points, a real-world magnitude of the real-world data point to a simulation magnitude of the simulation data point.

In the following, various examples are provided that may include one or more features of the simulator systems, including their calibration and training, discussed above. It may be intended that aspects described in relation to the devices may apply also to the described method(s), and vice versa.

Example 1 is a device comprising processing circuitry coupled to storage, wherein the processing circuitry is configured to collect real-world data points and simulation data points of a movement of a robot based on a heuristic policy that defines a threshold criterion for the movement of the robot. The processing circuitry is also configured to time-align at least two data points of the simulation data points to corresponding data points of the real-world data points at times where the threshold criterion is satisfied. The processing circuitry is also configured to determine a transformation parameter defined by a function that relates, for each simulation data point of the at least two data points and its corresponding real-world data point of the corresponding data points, a real-world magnitude of the real-world data point to a simulation magnitude of the simulation data point.

Example 2 is the device of example 1, wherein the processing circuitry is configured to determine the transformation parameter based only on the real-world magnitude and the simulation magnitude.

Example 3 is the device of either one of examples 1 or 2, wherein the real-world data point includes a measured contact wrench vector of an end-effector of the robot and the simulation data point includes a simulated contact wrench vector for the end-effector of the robot.

Example 4 is the device of example 3, wherein the real-world magnitude includes a magnitude of the measured contact wrench vector and the simulation magnitude includes a magnitude of the simulated contact wrench vector.

Example 5 is the device of either one of examples 3 or 4, wherein the measured contact wrench vector and simulated contact wrench vector each include a six-dimensional vector that includes a force component in three directions and a torque component around three axes.

Example 6 is the device of any one of examples 3 to 5, wherein the measured contact wrench vector includes a measured force and measured torque exerted at a point of contact between the robot and an object in an environment of the robot, wherein the simulated contact wrench vector includes a simulated force and simulated torque exerted at a simulated point of contact in a simulation of the robot and the environment.

Example 7 is the device of any one of examples 1 to 6, wherein the threshold criterion is in terms of at least one dimension of a contact wrench vector.

Example 8 is the device of any one of examples 1 to 7, wherein the threshold criterion includes a maximum force along a direction of movement of the robot.

Example 9 is the device of any one of examples 1 to 8, wherein the processing circuitry is further configured to generate movement instructions for the robot to perform a task, wherein the movement instructions are based on a transformation, according to the transformation parameter, of a simulated data point of the task to a real world data point of the task.

Example 10 is the device of any one of examples 1 to 9, the device further including a sensor configured to collect measurements representing the real-world data points.

Example 11 is the device of any one of examples 1 to 10, wherein the real-world data points include a series of measured contact wrench vectors collected at different points in time during the movement of the robot.

Example 12 is the device of any one of examples 1 to 11, wherein the simulation data points include simulated contact wrench vectors at different points in time during the movement of the robot.

Example 13 is the device of any one of examples 1 to 12, wherein the heuristic policy includes one or more rules that relate the threshold criterion in terms of a contact wrench vector.

Example 14 is the device of any one of examples 1 to 13, wherein the processing circuitry is configured to determine the transformation parameter based on a linear least-squares optimization.

Example 15 is the device of any one of examples 1 to 14, wherein the movement includes a change in position of an end-effector of the robot until the threshold criterion is satisfied.

Example 16 is the device of any one of examples 1 to 15, wherein the transformation parameter includes an output of a learning model that represents the function.

Example 17 is the device of any one of examples 1 to 16, wherein the processing circuitry is configured to train a learning model based on instructing the robot to execute a task and evaluating a resulting execution of the task.

Example 18 is a method that includes collecting real-world data points and simulation data points of a movement of a robot based on a heuristic policy that defines a threshold criterion for the movement of the robot. The method also includes time-aligning at least two data points of the simulation data points to corresponding data points of the real-world data points at times where the threshold criterion is satisfied. The method also includes determining a transformation parameter defined by a function that relates, for each simulation data point of the at least two data points and its corresponding real-world data point of the corresponding data points, a real-world magnitude of the real-world data point to a simulation magnitude of the simulation data point.

Example 19 is the method of example 18, wherein the determining the transformation parameter comprises determining the transformation parameter based only on the real-world magnitude and the simulation magnitude.

Example 20 is the method of either one of examples 18 or 19, wherein the real-world data point includes a measured contact wrench vector of an end-effector of the robot and the simulation data point includes a simulated contact wrench vector for the end-effector of the robot.

Example 21 is the method of example 20, wherein the real-world magnitude includes a magnitude of the measured contact wrench vector and the simulation magnitude includes a magnitude of the simulated contact wrench vector.

Example 22 is the method of either one of examples 20 or 21, wherein the measured contact wrench vector and simulated contact wrench vector each include a six-dimensional vector that includes a force component in three directions and a torque component around three axes.

Example 23 is the method of any one of examples 20 to 22, wherein the measured contact wrench vector includes a measured force and measured torque exerted at a point of contact between the robot and an object in an environment of the robot, wherein the simulated contact wrench vector includes a simulated force and simulated torque exerted at a simulated point of contact in a simulation of the robot and the environment.

Example 24 is the method of any one of examples 18 to 23, wherein the threshold criterion is in terms of at least one dimension of a contact wrench vector.

Example 25 is the method of any one of examples 18 to 24, wherein the threshold criterion includes a maximum force along a direction of movement of the robot.

Example 26 is the method of any one of examples 18 to 25, wherein the method further includes generating movement instructions for the robot to perform a task, wherein the movement instructions are based on a transformation, according to the transformation parameter, of a simulated data point of the task to a real world data point of the task.

Example 27 is the method of any one of examples 18 to 26, where method further includes collecting measurements (e.g., via a sensor) representing the real-world data points.

Example 28 is the method of any one of examples 18 to 27, wherein the real-world data points include a series of measured contact wrench vectors collected at different points in time during the movement of the robot.

Example 29 is the method of any one of examples 18 to 28, wherein the simulation data points include simulated contact wrench vectors at different points in time during the movement of the robot.

Example 30 is the method of any one of examples 18 to 29, wherein the heuristic policy includes one or more rules that relate the threshold criterion in terms of a contact wrench vector.

Example 31 is the method of any one of examples 18 to 30, wherein the method further includes determining the transformation parameter based on a linear least-squares optimization.

Example 32 is the method of any one of examples 18 to 31, wherein the movement includes a change in position of an end-effector of the robot until the threshold criterion is satisfied.

Example 33 is the method of any one of examples 18 to 32, wherein the transformation parameter includes an output of a learning model that represents the function.

Example 34 is the method of any one of examples 18 to 33, wherein the method further includes training a learning model based on instructing the robot to execute a task and evaluating a resulting execution of the task.

Example 35 is an apparatus that includes a means for collecting real-world data points and simulation data points of a movement of a robot based on a heuristic policy that defines a threshold criterion for the movement of the robot. The apparatus also includes a means for time-aligning at least two data points of the simulation data points to corresponding data points of the real-world data points at times where the threshold criterion is satisfied. The apparatus also includes a means for determining a transformation parameter defined by a function that relates, for each simulation data point of the at least two data points and its corresponding real-world data point of the corresponding data points, a real-world magnitude of the real-world data point to a simulation magnitude of the simulation data point.

Example 36 is the apparatus of example 35, wherein the means for determining the transformation parameter comprises a means for determining the transformation parameter based only on the real-world magnitude and the simulation magnitude.

Example 37 is the apparatus of either one of examples 35 or 36, wherein the real-world data point includes a measured contact wrench vector of an end-effector of the robot and the simulation data point includes a simulated contact wrench vector for the end-effector of the robot.

Example 38 is the apparatus of example 37, wherein the real-world magnitude includes a magnitude of the measured contact wrench vector and the simulation magnitude includes a magnitude of the simulated contact wrench vector.

Example 39 is the apparatus of either one of examples 37 or 38, wherein the measured contact wrench vector and simulated contact wrench vector each include a six-dimensional vector that includes a force component in three directions and a torque component around three axes.

Example 40 is the apparatus of any one of examples 37 to 39, wherein the measured contact wrench vector includes a measured force and measured torque exerted at a point of contact between the robot and an object in an environment of the robot, wherein the simulated contact wrench vector includes a simulated force and simulated torque exerted at a simulated point of contact in a simulation of the robot and the environment.

Example 41 is the apparatus of any one of examples 35 to 40, wherein the threshold criterion is in terms of at least one dimension of a contact wrench vector.

Example 42 is the apparatus of any one of examples 35 to 41, wherein the threshold criterion includes a maximum force along a direction of movement of the robot.

Example 43 is the apparatus of any one of examples 35 to 42, wherein the apparatus further includes a means for generating movement instructions for the robot to perform a task, wherein the movement instructions are based on a transformation, according to the transformation parameter, of a simulated data point of the task to a real world data point of the task.

Example 44 is the apparatus of any one of examples 35 to 43, where apparatus further includes a means for collecting measurements (e.g., via a sensor) representing the real-world data points.

Example 45 is the apparatus of any one of examples 35 to 44, wherein the real-world data points includes a series of measured contact wrench vectors collected at different points in time during the movement of the robot.

Example 46 is the apparatus of any one of examples 35 to 45, wherein the simulation data points includes simulated contact wrench vectors at different points in time during the movement of the robot.

Example 47 is the apparatus of any one of examples 35 to 46, wherein the heuristic policy includes one or more rules that relate the threshold criterion in terms of a contact wrench vector.

Example 48 is the apparatus of any one of examples 35 to 47, wherein the apparatus further includes a means for determining the transformation parameter based on a linear least-squares optimization.

Example 49 is the apparatus of any one of examples 35 to 48, wherein the movement includes a change in position of an end-effector of the robot until the threshold criterion is satisfied.

Example 50 is the apparatus of any one of examples 35 to 49, wherein the transformation parameter includes an output of a learning model that represents the function.

Example 51 is the apparatus of any one of examples 35 to 50, wherein the apparatus further includes a means for training a learning model based on instructing the robot to execute a task and evaluating a resulting execution of the task.

Example 52 is a non-transitory, computer-readable medium including instructions that, when executed, cause one or more processors to collect real-world data points and simulation data points of a movement of a robot based on a heuristic policy that defines a threshold criterion for the movement of the robot. The instructions also cause the one or more processors to time-align at least two data points of the simulation data points to corresponding data points of the real-world data points at times where the threshold criterion is satisfied. The also cause the one or more processors to determine a transformation parameter defined by a function that relates, for each simulation data point of the at least two data points and its corresponding real-world data point of the corresponding data points, a real-world magnitude of the real-world data point to a simulation magnitude of the simulation data point.

Example 53 is the non-transitory, computer-readable medium of example 52, wherein the instructions cause the one or more processors to determine the transformation parameter based only on the real-world magnitude and the simulation magnitude.

Example 54 is the non-transitory, computer-readable medium of either one of examples 52 or 53, wherein the real-world data point includes a measured contact wrench vector of an end-effector of the robot and the simulation data point includes a simulated contact wrench vector for the end-effector of the robot.

Example 55 is the non-transitory, computer-readable medium of example 54, wherein the real-world magnitude includes a magnitude of the measured contact wrench vector and the simulation magnitude includes a magnitude of the simulated contact wrench vector.

Example 56 is the non-transitory, computer-readable medium of either one of examples 54 or 55, wherein the measured contact wrench vector and simulated contact wrench vector each include a six-dimensional vector that includes a force component in three directions and a torque component around three axes.

Example 57 is the non-transitory, computer-readable medium of any one of examples 54 to 56, wherein the measured contact wrench vector includes a measured force and measured torque exerted at a point of contact between the robot and an object in an environment of the robot, wherein the simulated contact wrench vector includes a simulated force and simulated torque exerted at a simulated point of contact in a simulation of the robot and the environment.

Example 58 is the non-transitory, computer-readable medium of any one of examples 52 to 57, wherein the threshold criterion is in terms of at least one dimension of a contact wrench vector.

Example 59 is the non-transitory, computer-readable medium of any one of examples 52 to 58, wherein the threshold criterion includes a maximum force along a direction of movement of the robot.

Example 60 is the non-transitory, computer-readable medium of any one of examples 52 to 59, wherein the instructions also cause the one or more processors to generate movement instructions for the robot to perform a task, wherein the movement instructions are based on a transformation, according to the transformation parameter, of a simulated data point of the task to a real world data point of the task.

Example 61 is the non-transitory, computer-readable medium of any one of examples 52 to 60, the non-transitory, computer-readable medium further including a sensor configured to collect measurements representing the real-world data points.

Example 62 is the non-transitory, computer-readable medium of any one of examples 52 to 61, wherein the real-world data points include a series of measured contact wrench vectors collected at different points in time during the movement of the robot.

Example 63 is the non-transitory, computer-readable medium of any one of examples 52 to 62, wherein the simulation data points include simulated contact wrench vectors at different points in time during the movement of the robot.

Example 64 is the non-transitory, computer-readable medium of any one of examples 52 to 63, wherein the heuristic policy includes one or more rules that relate the threshold criterion in terms of a contact wrench vector.

Example 65 is the non-transitory, computer-readable medium of any one of examples 52 to 64, wherein the instructions also cause the one or more processors to determine the transformation parameter based on a linear least-squares optimization.

Example 66 is the non-transitory, computer-readable medium of any one of examples 52 to 65, wherein the movement includes a change in position of an end-effector of the robot until the threshold criterion is satisfied.

Example 67 is the non-transitory, computer-readable medium of any one of examples 52 to 66, wherein the transformation parameter includes an output of a learning model that represents the function.

Example 68 is the non-transitory, computer-readable medium of any one of examples 52 to 67, wherein the instructions also cause the one or more processors to train a learning model based on instructing the robot to execute a task and evaluating a resulting execution of the task.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. A device comprising processing circuitry coupled to storage, the processing circuitry configured to:
   collect real-world data points and simulation data points of a movement of a robot based on a heuristic policy that defines a threshold criterion for the movement of the robot;
   time-align at least two data points of the simulation data points to corresponding data points of the real-world data points at times where the threshold criterion is satisfied; and
   determine a transformation parameter defined by a function that relates, for each simulation data point of the at least two data points and its corresponding real-world data point of the corresponding data points, a real-world magnitude of the real-world data point to a simulation magnitude of the simulation data point;
   generate movement instructions for the robot to perform a task, wherein the movement instructions are based on a transformation, according to the transformation parameter, of a simulated data point of the task to a real world data point of the task; and
   control the robot to perform the task according to the movement instructions.

2. The device of claim 1, wherein the processing circuitry is configured to determine the transformation parameter based only on the real-world magnitude and the simulation magnitude.

3. The device of claim 1, the device further comprising a sensor configured to collect measurements representing the real-world data points.

4. The device of claim 1, wherein the real-world data point comprises a measured contact wrench vector of an end-effector of the robot and the simulation data point comprises a simulated contact wrench vector for the end-effector of the robot.

5. The device of claim 4, wherein the real-world magnitude comprises a magnitude of the measured contact wrench vector and the simulation magnitude comprises a magnitude of the simulated contact wrench vector.

6. The device of claim 4, wherein the measured contact wrench vector and simulated contact wrench vector each comprise a six-dimensional vector that comprises a force component in three directions and a torque component around three axes.

7. The device of claim 4, wherein the measured contact wrench vector comprises a measured force and measured torque exerted at a point of contact between the robot and an object in an environment of the robot, wherein the simulated contact wrench vector comprises a simulated force and simulated torque exerted at a simulated point of contact in a simulation of the robot and the environment.

8. The device of claim 1, wherein the threshold criterion is in terms of at least one dimension of a contact wrench vector.

9. The device of claim 1, wherein the threshold criterion comprises a maximum force along a direction of movement of the robot.

10. A non-transitory, computer-readable medium including instructions that, when executed, cause one or more processors to:

collect real-world data points and simulation data points of a movement of a robot based on a heuristic policy that defines a threshold criterion for the movement of the robot;

time-align at least two data points of the simulation data points to corresponding data points of the real-world data points at times where the threshold criterion is satisfied;

determine a transformation parameter defined by a function that relates, for each simulation data point of the at least two data points and its corresponding real-world data point of the corresponding data points, a real-world magnitude of the real-world data point to a simulation magnitude of the simulation data point;

generate movement instructions for the robot to perform a task, wherein the movement instructions are based on a transformation, according to the transformation parameter, of a simulated data point of the task to a real world data point of the task; and control the robot to perform the task according to the movement instructions.

11. The non-transitory, computer-readable medium of claim 10, wherein the instructions cause the one or more processors to determine the transformation parameter based only on the real-world magnitude and the simulation magnitude.

12. The non-transitory, computer-readable medium of claim 10, wherein the real-world data points comprise a series of measured contact wrench vectors collected at different points in time during the movement of the robot.

13. The non-transitory, computer-readable medium of claim 10, wherein the simulation data points comprise simulated contact wrench vectors at different points in time during the movement of the robot.

14. The non-transitory, computer-readable medium of claim 10, wherein the heuristic policy comprises one or more rules that relate the threshold criterion in terms of a contact wrench vector.

15. The non-transitory, computer-readable medium of claim 10, wherein the instructions cause the one or more processors to determine the transformation parameter based on a linear least-squares optimization.

16. The non-transitory, computer-readable medium of claim 10, wherein the movement comprises a change in position of an end-effector of the robot until the threshold criterion is satisfied.

17. The non-transitory, computer-readable medium of claim 10, wherein the transformation parameter comprises an output of a learning model that represents the function.

18. An apparatus comprising:

a means for collecting real-world data points and simulation data points of a movement of a robot based on a heuristic policy that defines a threshold criterion for the movement of the robot;

a means for time-aligning at least two data points of the simulation data points to corresponding data points of the real-world data points at times where the threshold criterion is satisfied;

a means for determining a transformation parameter defined by a function that relates, for each simulation data point of the at least two data points and its corresponding real-world data point of the corresponding data points, a real-world magnitude of the real-world data point to a simulation magnitude of the simulation data point;

a means for generating movement instructions for the robot to perform a task, wherein the movement instructions are based on a transformation, according to the transformation parameter, of a simulated data point of the task to a real world data point of the task; and a means for controlling the robot to perform the task according to the movement instructions.

19. The apparatus of claim 18, the apparatus further comprising a means for training a learning model based on instructing the robot to execute a task and evaluating a resulting execution of the task.

* * * * *